(12) United States Patent
Roth et al.

(10) Patent No.: US 9,479,492 B1
(45) Date of Patent: *Oct. 25, 2016

(54) AUTHORED INJECTIONS OF CONTEXT THAT ARE RESOLVED AT AUTHENTICATION TIME

(71) Applicant: Amazon Technologies, Inc., Reno, NV (US)

(72) Inventors: Gregory Branchek Roth, Seattle, WA (US); Kevin Ross O'Neill, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/145,654

(22) Filed: Dec. 31, 2013

Related U.S. Application Data

(63) Continuation of application No. 13/429,180, filed on Mar. 23, 2012, now Pat. No. 8,640,200.

(51) Int. Cl.
*H04L 29/06* (2006.01)
*G06F 21/10* (2013.01)
*G06F 21/31* (2013.01)

(52) U.S. Cl.
CPC .............. *H04L 63/08* (2013.01); *G06F 21/10* (2013.01); *G06F 21/31* (2013.01); *H04L 63/10* (2013.01)

(58) Field of Classification Search
CPC ....... H04L 63/08; H04L 63/10; H04L 21/10; H04L 21/31
See application file for complete search history.

(56) References Cited

U.S. PATENT DOCUMENTS

| | | | | |
|---|---|---|---|---|
| 5,764,890 | A * | 6/1998 | Glasser | G06F 21/31 713/155 |
| 6,067,623 | A * | 5/2000 | Blakley, III | G06F 21/6236 707/999.009 |
| 6,219,706 | B1 * | 4/2001 | Fan et al. | 709/225 |
| 6,609,198 | B1 * | 8/2003 | Wood et al. | 713/155 |
| 7,752,431 | B2 * | 7/2010 | Della-Libera et al. | 713/151 |
| 8,296,828 | B2 * | 10/2012 | Dalzell et al. | 726/6 |
| 8,640,200 | B1 | 1/2014 | Roth | |

(Continued)

OTHER PUBLICATIONS

U.S. Non-Final Office Action dated Apr. 24, 2013 issued in U.S. Appl. No. 13/429,180.

(Continued)

*Primary Examiner* — Joseph P Hirl
*Assistant Examiner* — Stephen Gundry
(74) *Attorney, Agent, or Firm* — Hogan Lovells US LLP

(57) ABSTRACT

Techniques are described for enabling principals to inject context information into a credential (e.g. session credential). Once the credential has been issued, any arbitrary principal is allowed to inject context information into the existing credential. The injected context is scoped to the principal that made the injection. Subsequently, at authentication time, when the credential is used to request access to a particular resource, the system can verify whether the principal that made the injection is trusted and if the principal is deemed trusted, the context information can be applied to a policy that controls access to one or more resources, or can alternatively be translated into some context residing in a different namespace which can then be applied to the policy. In addition, the system enables arbitrary users to insert additional deny statements into an existing credential, which further restrict the scope of permissions granted by the credential.

19 Claims, 6 Drawing Sheets

(56) References Cited

U.S. PATENT DOCUMENTS

| | | | | |
|---|---|---|---|---|
| 8,656,471 B1* | 2/2014 | Allen | H04L 63/08 | 726/19 |
| 8,955,149 B1* | 2/2015 | Baer | G06F 17/30 | 709/229 |
| 9,098,675 B1* | 8/2015 | Roth | G06F 21/00 | |
| 2001/0020228 A1* | 9/2001 | Cantu et al. | 705/1 | |
| 2002/0112171 A1* | 8/2002 | Ginter et al. | 713/185 | |
| 2003/0028622 A1* | 2/2003 | Inoue et al. | 709/219 | |
| 2004/0122958 A1* | 6/2004 | Wardrop | G06F 17/30206 | 709/229 |
| 2008/0163361 A1* | 7/2008 | Davis | G06F 21/31 | 726/19 |
| 2011/0047603 A1* | 2/2011 | Gordon et al. | 726/5 | |
| 2012/0185391 A1* | 7/2012 | Sirota | G06Q 10/06315 | 705/44 |
| 2013/0086645 A1* | 4/2013 | Srinivasan | H04L 63/10 | 726/4 |
| 2013/0086663 A1* | 4/2013 | Roth | H04L 9/083 | 726/7 |
| 2013/0152153 A1* | 6/2013 | Weiser et al. | 726/1 | |
| 2013/0198824 A1* | 8/2013 | Hitchcock | G06F 21/00 | 726/6 |
| 2014/0082715 A1* | 3/2014 | Grajek | H04L 63/0815 | 726/8 |

OTHER PUBLICATIONS

U.S. Notice of Allowance dated Oct. 9, 2013 issued in U.S. Appl. No. 13/429,180.

\* cited by examiner

US 9,479,492 B1

AUTHORED INJECTIONS OF CONTEXT THAT ARE RESOLVED AT AUTHENTICATION TIME

CROSS-REFERENCE TO RELATED APPLICATIONS

This application is a continuation application of U.S. Nonprovisional application Ser. No. 13/429,180, filed Mar. 23, 2012, entitled "AUTHORED INJECTIONS OF CONTEXT THAT ARE RESOLVED AT AUTHENTICATION TIME," which is incorporated herein by reference in its entirety for all purposes.

BACKGROUND

In today's Internet communications, many web sites are designed to authenticate and track a user when communication is first established. In order to accomplish this, users typically identify themselves to the web site by supplying a username and password combination. Thereafter, the web site will generate a credential (e.g. a unique session identifier) to identify the user's session as having been authenticated. Subsequent interaction between the user and the web site is performed by using the credential as proof of the authenticated session. This eliminates the need to pass the confidential user name and password combination back and forth with each transaction, while still enabling the communication between the user and the web site to remain secure.

Credentials may also be used in many other aspects of computer security, such as to provide authentication and authorization, access control lists, encryption and decryption of electronic communications, digital rights management (DRM) and a variety of other contexts. In most instances, the use of credentials follows the paradigm of first issuing a credential to a user or other entity and subsequently allowing that user or entity to utilize the credential to assert their identity or gain permission to perform a particular action.

BRIEF DESCRIPTION OF THE DRAWINGS

Various embodiments in accordance with the present disclosure will be described with reference to the drawings, in which.

DETAILED DESCRIPTION

Figure 1:
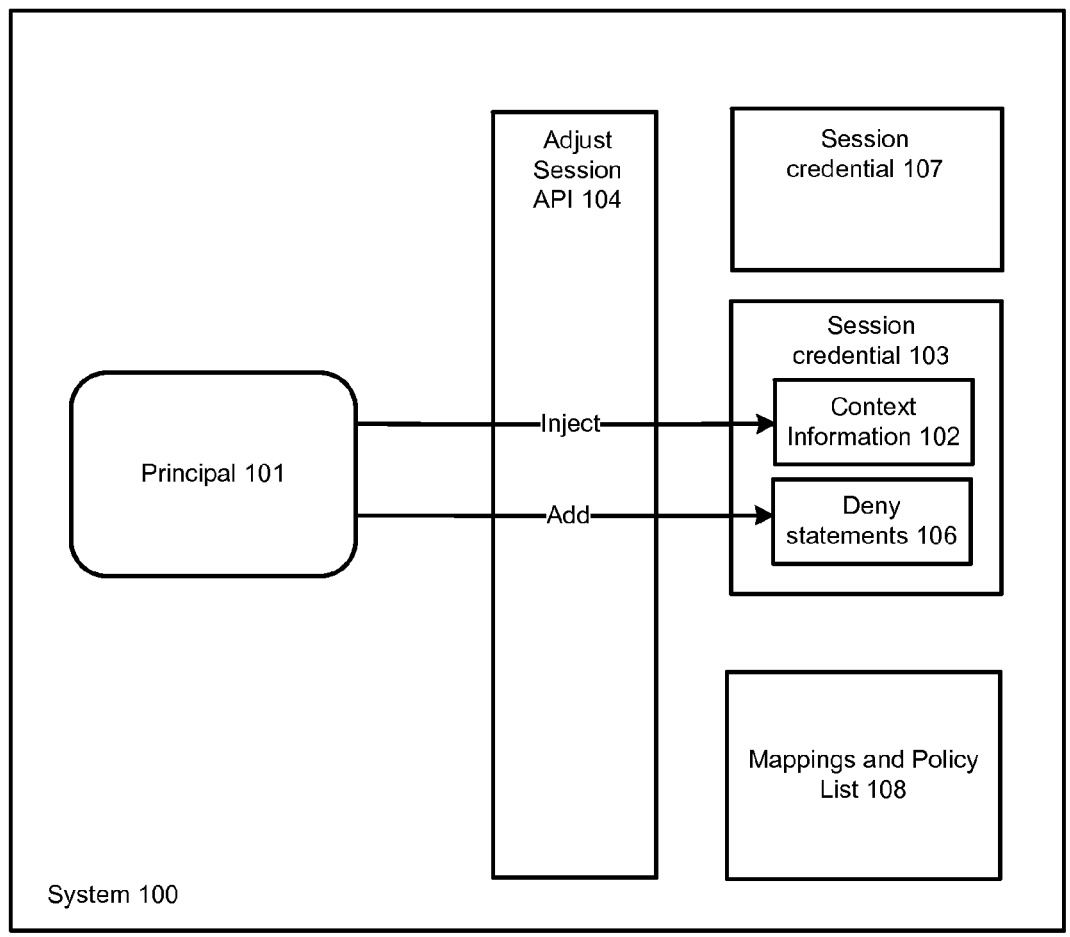
FIG. 1 illustrates an example of injecting context information into an existing credential, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with the embodiments described herein overcome the various deficiencies in existing approaches for providing security in computer systems. In particular, the various embodiments provide approaches for providing the ability to enrich existing credentials or principals with additional context information that can be utilized later at authentication time.

In accordance with various embodiments, systems and methods are described for enabling arbitrary principals to inject context information into a session credential or principal. As used throughout this disclosure, a credential can be any object that is used to establish an identity or obtain permission to perform a particular action by a user, application or other entity on a computing device. Credentials can include but are not limited to session objects, unique identifiers, user names and passwords, cryptographic keys, tickets, certificates and various other constructs. For example, the credential can be provided by a server to a user in order to indicate that the user has been authenticated, and the user may subsequently use the credential to log into various systems, access and modify data, and perform a wide variety of other functions that they may otherwise be restricted from doing. As used throughout this disclosure, a principal represents a user or any other entity that can be authenticated by a computer system or network. Principals are usually capable of being assigned rights to various resources in the system. A principal is usually associated with a unique identifier that allows the principal to be referenced for identification purposes or for assigning permissions.

In accordance with an embodiment, once the credential has been issued to a user by a server (or other issuing authority), any arbitrary principal or user is then allowed to inject context information into the existing credential. The injected context information is then associated with a specific scope based on the injection. For example, the context information may be scoped to the principal that provided the injection. In an alternative embodiment, any arbitrary principal is allowed to inject context information into another principal. For example, an author principal may inject information specifying that another principal is associated with a particular attribute. The injected context is then scoped to the author principal that made the injection.

At authentication time, when the credential is used to request access to a particular resource or action, the system can first determine which principal made the injection of the context information into the credential and also determine whether that the author principal is trusted by the system. If the author principal is deemed to be trusted, the context information can be applied to a policy that controls access to one or more resources, or can alternatively be translated into some context residing in a different namespace which can then be applied to the policy.

In this manner, a principal is allowed to enrich a credential (or another principal) after it has been created with additional context information that can be relevant for a policy which is applied to the credential at authentication or authorization time. Because any arbitrary principal is allowed to make the injection, no security assertions need to be made at the time of injection and all the verifications can be performed later upon authentication.

In accordance with various embodiments, the context information can be injected by using an application programming interface (API). In accordance with one embodiment, the API invocation can receive a session token credential, a set of new injections of context information, and a set of added deny statements to be applied to the policy. The specified injections can be scoped to the injection author (e.g. the identifier of the principal calling the API). For example, if principal 1 injects the internet protocol (IP) address of the source of a request, the final injection can take the format of "principal1/sourceip."

During authentication time, a published document can be utilized to map the fully scoped injections into more general context information that will be applied to the credential. In accordance with an embodiment, the published document can be a policy or a collection of policies that is processed at the time when the credential is used to request a particular action.

Additionally, the system described herein allows any arbitrary principal to add deny statements to the credential after it has been issued. The deny statements are statements that further restrict the permissions or access rights granted by the credential. In accordance with an embodiment, because deny statements can only restrict access and cannot expand it, they can be safely added by any principal.

FIG. 1 illustrates an example of injecting context information into an existing credential, in accordance with various embodiments. As illustrated, an application programming interface (API) 104 can be provided with an "adjust session" method, which can be used to enrich a credential 103 with some context information after the credential has been issued by the system 100 or some other authority. In this figure, the credentials are illustrated as being session objects (103, 107) that are each associated with the session of a particular user interacting with the server. However, in alternative embodiments, the credentials can take the form of different objects, such as keys, tickets, certificates, and others previously described.

In accordance with an embodiment, a principal 101 is allowed to invoke the adjust session API 104 in order to inject context information 102 into the session credential 103. The context information can be any information that will be utilized by the system at a later point in time, such as at the time of using the credential for authentication. For example, the context information may specify the source internet protocol (IP) address of a user that is associated with the session. While the system 100 allows any arbitrary principal to make the injection, the injected context information is scoped to the author that has made the injection. For example, if principal having principal ID 123 makes an injection of a particular key XYZ, the context information injected into the credential is of the form "principal123/keyXYZ."

In accordance with an embodiment, the context information is injected by taking the existing session credential, generating a new credential that has the context information embedded therein and returning the new credential as a response to the API call. Alternatively, the context information can be embedded directly into the existing credential. In either case, the session credential 103 remains associated with the entity that was originally issued the credential by the system.

Once the context information has been injected, it can remain with the credential for the lifetime of the credential or, in some embodiments, until it is removed by an authorized user. The context information can be used by the system when applying the credential at authentication or authorization time. For example, if a policy needs the context information to perform some appropriate security check during authentication, the system can retrieve the context information from the credential and if the principal that injected the context is deemed trusted, the system can utilize that context to perform the check. In accordance with an embodiment, the system can also utilize a mapping document 108 to translate the context information from being scoped to the principal into a more general context that is scoped to the appropriate security authority or namespace applicable to the policy. For example, if the context injected into the credential is of the form "principal1/sourceIP" and if principal1 is deemed trusted, the system can translate the context into a more general context, such as "securityAuthority/sourceIP" or the like. The mapping file 108 can be managed separately from the injections by various principals and can be directly controlled by the security authority.

In accordance with an embodiment, the system 100 also allows the principal to add one or more deny statements 106 to the session credential 103. A deny statement can be any restriction or limitation on the scope of access rights that would normally be granted by the use of the credential 103. In accordance with an embodiment, any arbitrary principal 101 can specify a deny statement to be added to the session credential 103. When the principal invokes the API to add a deny statement, the system can first verify that the statement purported to be a deny statement would indeed restrict the scope of permissions granted by the credential. If the statement would expand the scope of permissions in any manner, the system can reject the addition of the deny statement. If the statement does pass the verification of being a true deny statement, the system can insert the statement into the session credential 103. Thereafter (e.g. upon authentication or authorization time), any user that uses the credential will be subject to the restrictions specified in the deny statements 106.

Figure 2:
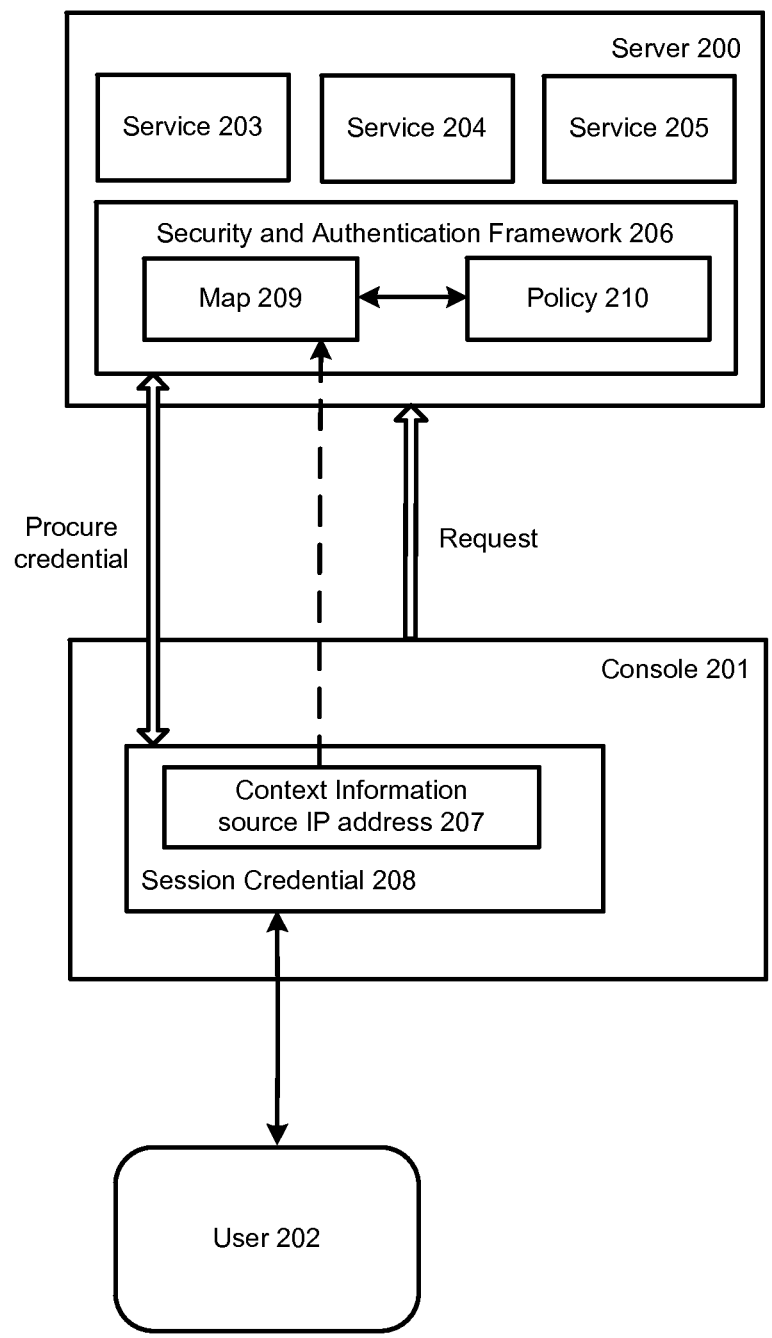
FIG. 2 illustrates an example use case of applying context injections into an existing credential, in accordance with various embodiments.

FIG. 2 illustrates an example use case of applying context injections into an existing credential, in accordance with various embodiments. In particular, this figure illustrates an example where a remote console enables a principal to inject the source IP address of the user that originated the communication into the credential. As illustrated, a remote console 201 can be an external web site that allows various users to access the services (203, 204, 205) provided by server 200. The console can be configured to use session credentials to identify its various users. Thus, in accordance with an embodiment, the console 201 can procure credentials from the security and authentication framework 206 of the server 200 (or some other authority) and later utilize them to secure the various interactions with the server. For example, the console 201 can store the session credential 208 in a cookie (e.g. HTTP cookie) and when the user initiates a request, the console can sign the request and invoke the call against the server 200.

In accordance with at least one embodiment, the access policy 210 on the server 200 may refer to the source IP address of the user 202. If the console would make the request without any context information, the source IP address would appear to be the console's IP address, which does not reflect the user's actual address. Accordingly, it may be desirable for a principal to add some extra context information 207 to the credential 208, in order to specify the true source IP address of the user 202.

At the time of injection, this context information 207 can be un-translated and un-authorized, and scoped to the entity that made the injection. When the request is finally made from the console to the server, as part of authenticating the request, the security framework on the server can recognize that there has been some extra context information added to the credential associated with the request, which indicates the source IP address. At this point, the security framework of the server can look up an authorization whitelist which specifies whether the entity that has made the injection is allowed to specify the source IP of the request. If the whitelist allows the injector to specify the source IP (e.g. if the principal is deemed trusted), the server can then map 209 the source IP address from being scoped to the principal into a more general context that is of a scope relevant to the security framework of the server 200 and applicable to the policy 210.

Figure 3:
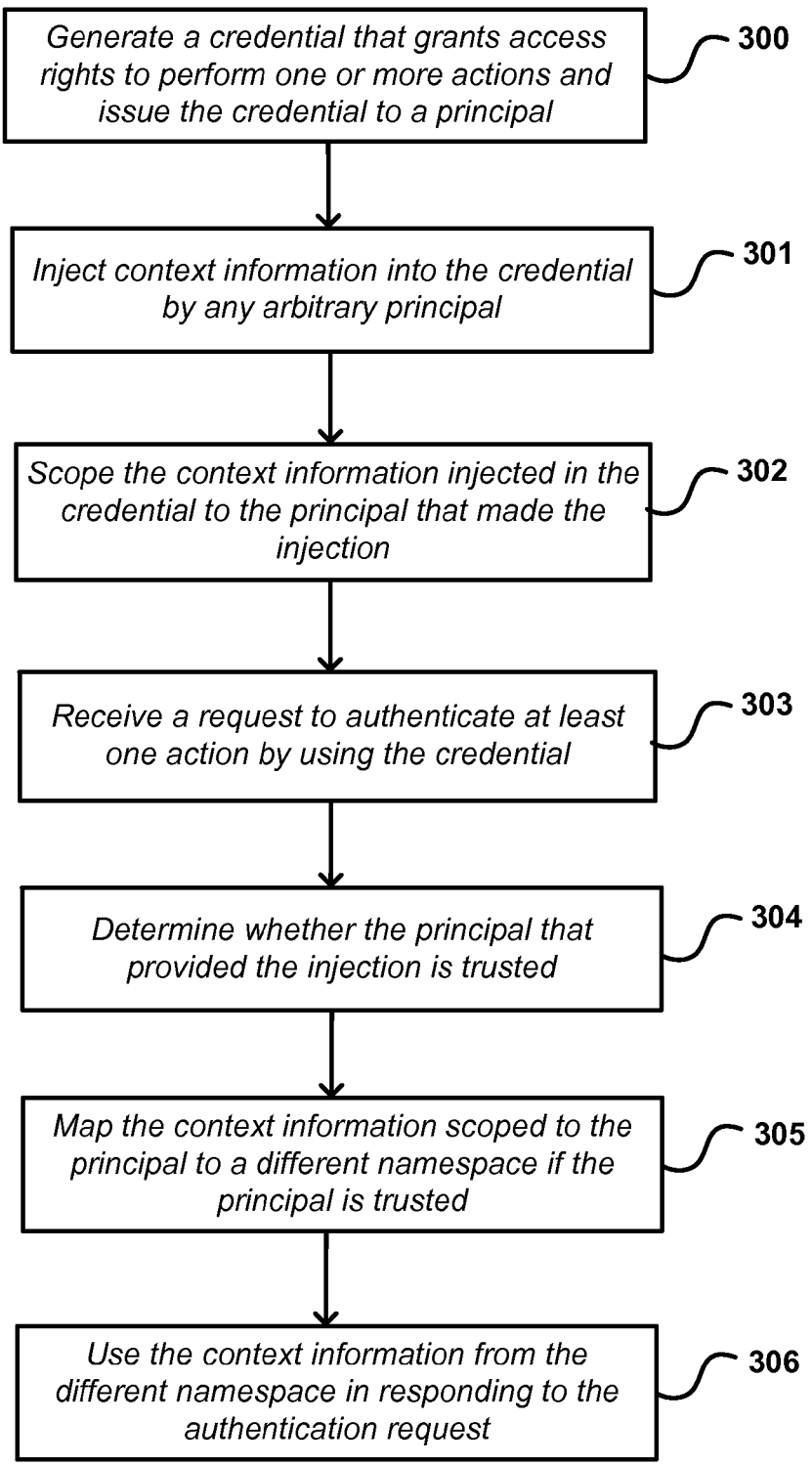
FIG. 3 illustrates an example process that can be used to provide context injections into existing credentials, in accordance with various embodiments.

FIG. 3 illustrates an example process that can be used to provide context injections into existing credentials, in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments.

As shown in operation 300, the process can begin with a server (or other issuing entity) generating a credential that will grant the holder of the credential a set of access rights to perform one or more actions. In accordance with an embodiment, the credential can be issued to a user or application that has been initially authenticated. Alternatively, the credential may be issued to users or applications that have not yet been authenticated. In accordance with an embodiment, the credential is associated with the session of a user initiating interaction with the console or server.

In operation 301, the system allows any arbitrary principal to inject context information into the credential after it has been created. The injection of the context information can occur in a different location then the step of generating the credential and issuing it to a principal. In accordance with one embodiment, the user or application that has been issued the credential can use an API to inject the context information to the credential. In alternative embodiments, a different user or application can be allowed to inject the context information, even though the credential was not originally issued for the injecting user.

In operation 302, the context information injected into the credential is scoped to the principal that has made the injection. In accordance with one embodiment, no security assertions are performed at this point, allowing any user or principal to inject the context without requiring them to satisfy any additional security measures.

In operation 303, subsequently at authentication time, a request can be received to use the credential to grant access to a resource or to perform a particular action. For example, the credential can be asserted by the user making a request to access a web service, read/write a table in a database, log into another system or the like. The authentication request can be accompanied by the credential that is provided to the security authority.

In operation 304, the security authority can determine whether the principal that has made the injection is deemed trusted. For example, the server can inspect a white list of all authorized users and principals that are allowed specify the context information contained in the credential.

In operation 305, if the principal is deemed trusted, the context information is mapped or translated into a different namespace. For example, the context information can be translated from being scoped to the principal that has made the injection to context of a more global scope that is applicable to the policy on the system.

In operation 306, the translated context information is used in satisfying the authentication request. For example, if the policy references a source IP address that is provided by a security framework, the context information translated from the source IP contained in the credential can be used to authenticate the request.

Figure 4:
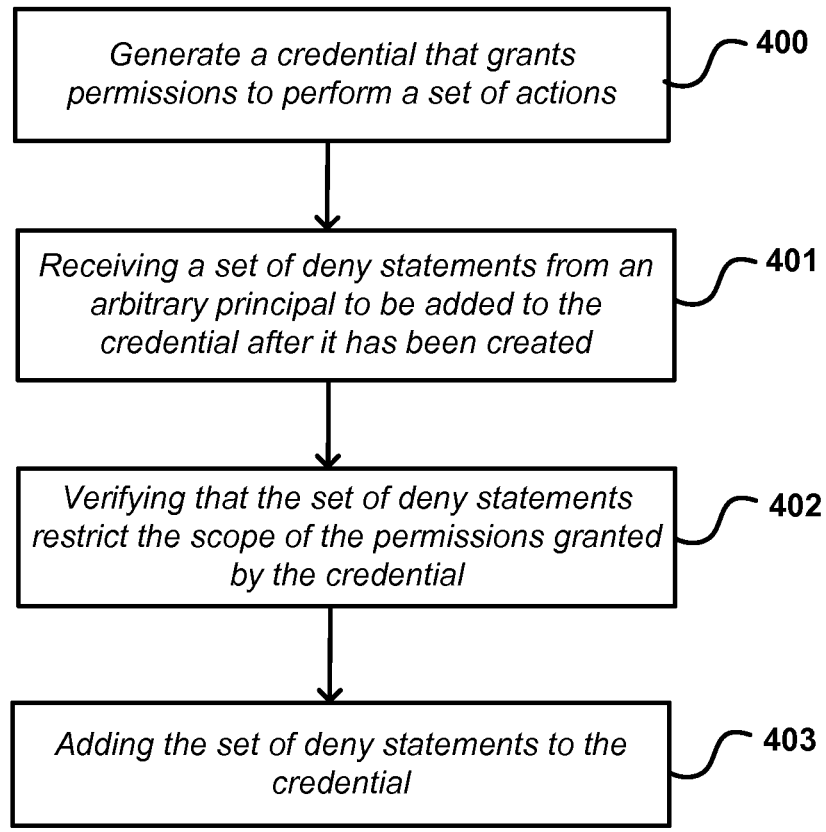
FIG. 4 illustrates an example process that can be used for adding deny statements to an existing credential, in accordance with various embodiments.

FIG. 4 illustrates an example process that can be used for adding deny statements to an existing credential, in accordance with various embodiments.

As shown in operation 400, the system can issue a credential to a selected entity, as previously described. In operation 401, the system can receive a set of deny statements to be added to the credential. In one embodiment, the deny statements can be provided by any arbitrary principal utilizing an API to modify the session credential.

In operation 402, the system verifies that the set of added statements in fact do restrict the scope of the permissions that would normally be granted by this credential. In accordance with an embodiment, if the added statements do not enlarge the scope of the credential in any way, they can be deemed true deny statements. If the purported statements do in fact pass this verification, they can be added to the credential (operation 403). Thereafter, if the credential is used to authenticate or authorize access, the added deny statements can restrict the holder of the credential from performing the actions prohibited by the deny statements.

Figure 5:
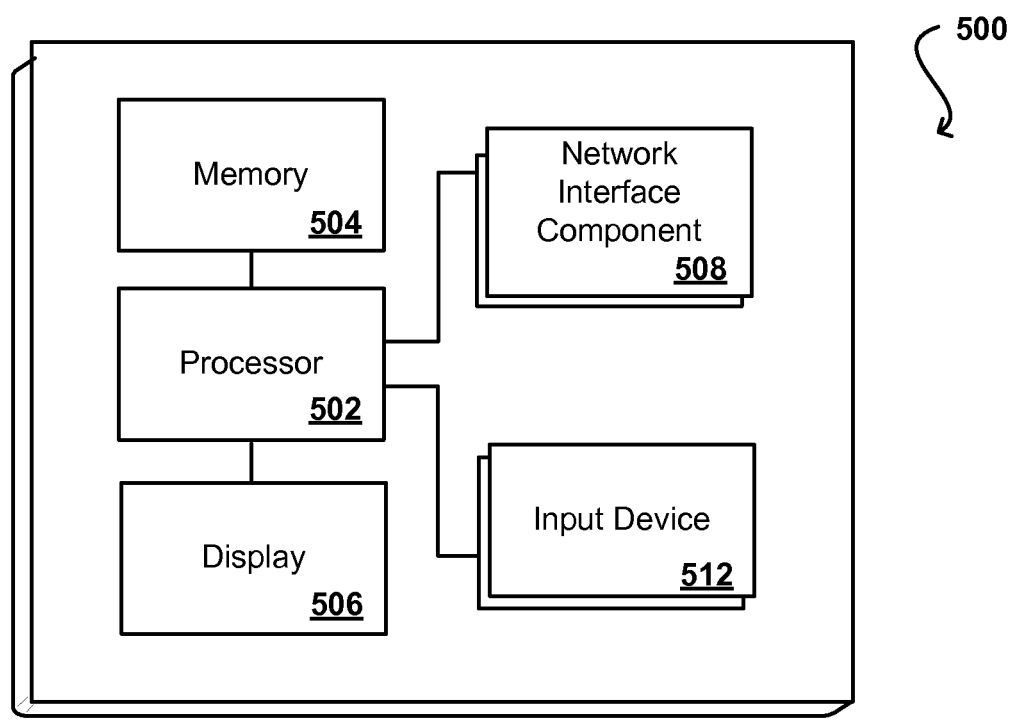
FIG. 5 illustrates a logical arrangement of a set of general components of an example computing device.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Figure 6:
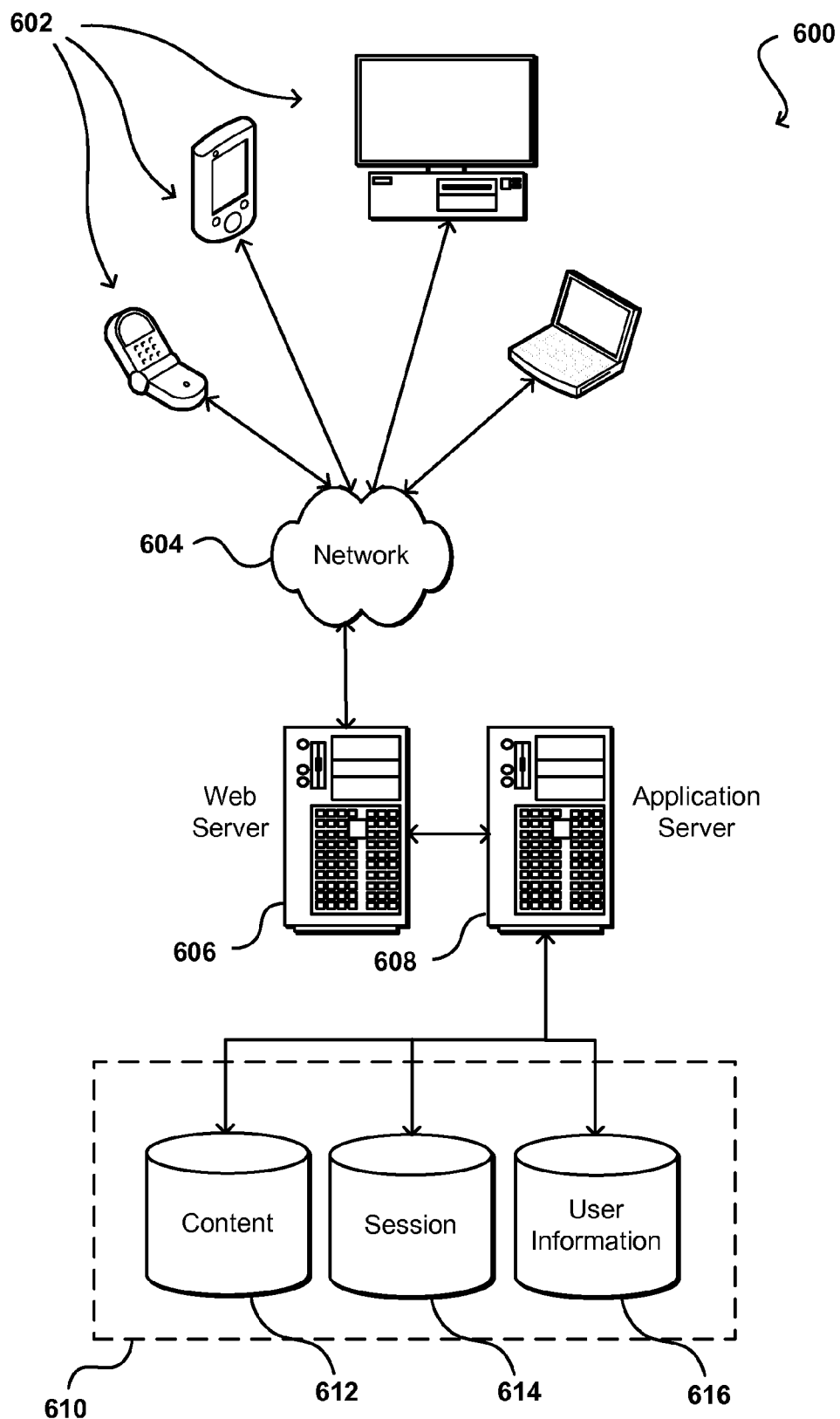
FIG. 6 illustrates an example of an environment for implementing aspects in accordance with various embodiments.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, the method comprising:
    receiving context information from a first principal, the context information relating to access rights for a second principal to perform at least one action;
    scoping the context information to a namespace associated with the first principal;
    inserting the context information in a credential, the credential having been issued to the second principal prior to the receiving of the context information;
    receiving, by a server, an authentication request from the second principal;
    determining a trusted status of the first principal based at least in part on a determination that the first principal was authorized to insert the context information into the credential; and
    sending, from the server to a client associated with the second principal, an authentication response that includes the credential having the context information inserted therein, the context information evaluated for the second principal to perform the at least one action based at least on the trusted status of the first principal.

2. The computer-implemented method of claim 1, the computer-implemented method further comprising:
    determining that the first principal is trusted; and
    mapping the context information scoped to the first principal to a different scope associated with the second principal.

3. The computer-implemented method of claim 2, wherein mapping the context information scoped to the first principal to the different scope further comprises:
    mapping, based on a mapping policy, the context information scoped to the first principal to a general context that is scoped to a security authority.

4. The computer-implemented method of claim 2, wherein determining that the first principal is trusted further comprises:
    determining, based on a whitelist, that the first principal is authorized to provide the context information to be inserted in the credential.

5. The computer-implemented method of claim 2, wherein inserting the context information in the credential further comprises:
    modifying the credential to include the mapping.

6. The computer-implemented method of claim 2, wherein inserting the context information in the credential further comprises:
    generating, based in part on the credential, a new credential that includes the context information.

7. The computer-implemented method of claim 1, wherein the context information specifies a network address of a user that has initiated a session with the second principal.

8. The computer-implemented method of claim 1, the computer-implemented method further comprising:
 receiving, from a third principal, at least one deny statement to be included the credential;
 determining that the at least one deny statement restricts a scope of access granted by the credential; and
 inserting the at least one deny statement in the credential.

9. The computer-implemented method of claim 8, the computer-implemented method further comprising:
 providing the credential having the at least one deny statement to the second principal, wherein the access granted by the credential is restricted based on the at least one deny statement.

10. A computer-implemented method, the method comprising:
 receiving, by a server from a client associated with a first principal, context information to be included in a credential, the context information relating to access rights for a second principal to perform at least one action, the credential having been issued to the second principal prior to the receiving of the context information;
 scoping the context information to be included in the credential to the first principal;
 inserting the context information in the credential;
 receiving an authentication request from the second principal; and
 sending, from the server to a client associated with the second principal, an authentication response that includes the credential having the context information inserted therein, the context information evaluated for the second principal to perform the at least one action based at least on a trusted status of the first principal, the trusted status of the first principal based at least in part on a determination that the first principal was authorized to insert the context information into the credential.

11. The computer-implemented method of claim 10, the computer-implemented method further comprising:
 receiving, from a third principal, at least one deny statement to be included the credential;
 determining that the at least one deny statement restricts a scope of access granted by the credential; and
 inserting the at least one deny statement in the credential.

12. The computer-implemented method of claim 10, wherein inserting the context information in the credential further comprises:
 generating, based in part on the credential, a new credential that includes the context information.

13. The computer-implemented method of claim 10, wherein inserting the context information in the credential further comprises:
 injecting the context information into the credential, wherein the injection is performed through an Application Programming Interface (API).

14. The computer-implemented method of claim 10, wherein the context information specifies a network address the client associated with the second principal that has initiated a session with the second principal.

15. A computer-implemented method, the method comprising:
 receiving, by a server, an authentication request from a first principal;
 determining a trusted status of a second principal based at least in part on a determination that the second principal is authorized to enrich a credential with context information, the context information relating to access rights for the first principal to perform at least one action, the credential having been issued to the first principal prior to the second principal receiving the context information to enrich the credential;
 generating, by the server, an authentication response, the authentication response including the credential that has been enriched with the context information, the context information having been scoped to a namespace associated with the second principal; and
 sending, from the server to a client associated with the second principal, the authentication response that includes the credential having been enriched with the context information, the context information evaluated for the first principal to perform the at least one action based at least in part on the trusted status of the second principal, the trusted status of the second principal based at least in part on a determination that the second principal was authorized to enrich the credential with the context information.

16. The computer-implemented method of claim 15, wherein the context information specifies a network address of a user that has initiated a session with the first principal.

17. The computer-implemented method of claim 15, the computer-implemented method further comprising:
 receiving, from a third principal, at least one deny statement to be included the credential;
 determining that the at least one deny statement restricts a scope of access granted by the credential; and
 inserting the at least one deny statement in the credential.

18. The computer-implemented method of claim 17, the computer-implemented method further comprising:
 providing the credential having the at least one deny statement to the first principal, wherein the access granted by the credential is restricted based on the at least one deny statement.

19. The computer-implemented method of claim 15, the computer-implemented method further comprising:
 determining that the second principal is trusted; and
 mapping, based on a mapping policy, the context information scoped to the second principal to a general context that is scoped to a security authority.

* * * * *